(12) United States Patent
Smith

(10) Patent No.: US 6,680,119 B2
(45) Date of Patent: *Jan. 20, 2004

(54) INSULATED ELECTRICAL COIL HAVING ENHANCED OXIDATION RESISTANT POLYMERIC INSULATION COMPOSITION

(75) Inventor: James D. B. Smith, Monroeville, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/934,542

(22) Filed: Aug. 22, 2001

(65) Prior Publication Data

US 2003/0044605 A1 Mar. 6, 2003

(51) Int. Cl.[7] .............................................. B32B 15/00
(52) U.S. Cl. ...................... 428/379; 428/375; 428/377; 428/396; 428/417; 428/418; 174/122 R; 174/122 G; 174/124 GC; 336/96
(58) Field of Search ................... 428/375, 379, 428/396, 417, 377, 418; 174/122 R, 122 G, 122 C, 120 C, 121 A, 124 GC; 525/109, 122, 529, 533; 336/96; 252/401, 404, 405, 406; 528/112, 113

(56) References Cited

U.S. PATENT DOCUMENTS

| | | | |
|---|---|---|---|
| 3,819,410 A | 6/1974 | Kuckro et al. ............... 117/232 |
| 3,956,241 A * | 5/1976 | Steele et al. .................. 260/47 |
| 3,956,420 A | 5/1976 | Kato et al. ................... 260/827 |
| 4,113,791 A * | 9/1978 | Smith et al. ................. 260/830 |
| 4,137,275 A | 1/1979 | Smith et al. ................. 260/830 |
| 4,173,593 A | 11/1979 | Smith et al. ................. 525/109 |
| 4,198,310 A | 4/1980 | Lyons et al. ................ 252/63.2 |
| 4,204,181 A | 5/1980 | Smith et al. ................... 336/96 |
| 4,224,541 A * | 9/1980 | Smith et al. ................... 310/45 |
| 4,246,161 A * | 1/1981 | Smith et al. ................... 310/43 |
| 4,254,351 A | 3/1981 | Smith et al. ................... 310/45 |
| 4,260,661 A | 4/1981 | Walters et al. ............... 428/389 |
| 4,273,914 A * | 6/1981 | Smith et al. ................... 528/89 |
| 4,814,391 A * | 3/1989 | Colburn ...................... 525/370 |
| 4,824,883 A | 4/1989 | Walter et al. .................. 524/93 |
| 4,855,467 A * | 8/1989 | Colburn ........................ 556/40 |
| 5,089,565 A * | 2/1992 | Blum et al. .................. 525/375 |
| 5,460,885 A | 10/1995 | Chu-Ba ....................... 428/383 |
| 5,904,888 A * | 5/1999 | Hayes et al. ............ 264/331.12 |
| 5,904,984 A | 5/1999 | Smith et al. .................. 428/396 |
| 5,939,472 A * | 8/1999 | Ito et al. ...................... 523/443 |

FOREIGN PATENT DOCUMENTS

EP 119617 * 9/1984

* cited by examiner

Primary Examiner—Cynthia H. Kelly
Assistant Examiner—J. M. Gray

(57) ABSTRACT

An insulated electrical coil is disclosed and is formed from a plurality of turns of coil, each having a cured body of resinous insulation applied to each turn of coil. The insulation is formed from a cured resinous composition of epoxy-anhydride resin that has been prereacted with an antioxidant oligomer selected from the group consisting of organophosphorus compounds, sterically-hindered alkylated phenolics, alkyl and aryl thio-esters, alkyl and aryl thio-phosphites, thiazoles, lactones, hydroxylamines, and maleimides.

18 Claims, 2 Drawing Sheets

INSULATED ELECTRICAL COIL HAVING ENHANCED OXIDATION RESISTANT POLYMERIC INSULATION COMPOSITION

FIELD OF THE INVENTION

This invention relates polymeric materials used in air-cooled generators and a method of forming same, and more particularly, this invention relates to polymeric materials used with electrical insulation, tapes, coatings and similar applications which are more resistant than conventional materials to the effects of corrosive byproducts, e.g., ozone, peroxy free radicals, produced by partial discharges within an electrical generator.

BACKGROUND OF THE INVENTION

One critical factor that determines the long-term performance of electrical insulation and other materials used in air-cooled generators is the stability of the polymeric materials to thermal, mechanical and electrical stresses. The resistance of organic polymeric materials to oxidative degradation, particularly at elevated temperatures, is a key requirement for obtaining satisfactory, long-term performance.

Some polymers, however, oxidize more readily than others. For example, high aliphatic content polyesters tend to degrade more readily than epoxies, resulting in a loss of key properties, such as adhesion, flexibility, tensile strength, dielectric strength, and other similar properties. Thermal oxidative degradation of polymeric insulation materials also leads to degraded operating properties in motor and generator insulation, including partial discharges, increasing tan ∂ "tip-up" of delamination, fracture and embrittlement. The attack from ozone and other reactive peroxy radical species resulting from partial discharges in the generator are particularly harmful.

Some electrical utilities have aggressively tested these electrical components under thermal stressed conditions. These studies have shown that under aggressive conditions, in an air ambient, premature coil degradation can occur, as evidenced by decreased voltage-loss tangent tip-up and increased power factor measurements. If failure is defined as a measured decrease in tip-up and increased power factor, then these coils have experienced an increased failure rate under these more stressful conditions.

There is also a concern with electric utilities and power generator manufacturers that the epoxy resins tend to degrade in air via an "autocatalytic" free radical chain process where runaway degradation occurs. There is also a potential for the high electric fields to enhance this degradation process via discharge and polarization effects. This enhances electrochemically induced reactions. The present uncertainty of the chemical reactions in air is highlighted by a possible competing mechanism where polarization effects may retard degradation. For example, some prior art studies have noted the aging of epoxy based rotor insulation in air (20% $O_2$) and in 5% $O_2$.

The exact mechanism that is responsible for the thermo-oxidative degradation of resins, such as epoxies, is not understood in great detail. It is generally believed, however, by many skilled in the art, that the chemical species responsible for thermal degradation are free radicals, i.e., very reactive transient compounds, which are derived from atmospheric oxygen and breakdown fragments from the polymer resin. In the case of a bisphenol "A" epoxy resin, it has been found that the

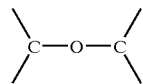

ether linkage and isopropylidene group are weak links

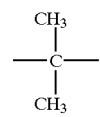

for free radical attack. It has been found that the combination of temperature and oxygen produces an "autocatalytic" effect, which causes more rapid polymer degradation than some thermal effects. By controlling or "trapping" the free radical species responsible for degradation, improved thermo-oxidative stability composition of polymers could be developed, such as epoxies and polyesters.

It has been known to add "antioxidant" additives for controlling oxidation of polymers and plastics. These additives have been used commercially in different materials, such as polyethylene, polypropylene, neoprene, and other thermoplastics and elastomers. They have not had widespread use in thermoset materials, e.g., polyesters and epoxies, because of a perception that thermosets are more resistant to oxidative attack. Although this may be true for "normal" use, it is not true for the harsher, stressful environments found with high voltage electrical insulation, particularly with ozone present in elevated temperature oxidative environments of air-cooled generators.

Any selected antioxidant materials should be "compatible" with insulation resins such as epoxies and polyesters. "Compatible" would indicate that these additives have no deleterious effect on the long-term performance and properties of insulation polymers (e.g., electrical, mechanical, and chemical properties). These additives should also not have any adverse effect on the processing characteristics of the resins, for example, the gel time, viscosity, tank stability, post-cure and "wetting" of mica. Most commercially available antioxidants would have adverse effects on these polymers. This would be particularly true of amine and organometallic based compounds.

Another problem associated with common, prior art antioxidants is migration from the polymer composition over time because of elevated temperatures, causing the polymer to lose its protection. This migration of antioxidant, however, can be controlled by chemically bonding the antioxidant to the polymer structure and preventing loss of the additive.

For suitability in high voltage insulation, any antioxidants should have the following characteristics:

1. They should be compatible with the resin and have no deleterious effect on long-term performance or on the processing characteristics.
2. They should be "non-fugitive" in nature, i.e., they should not migrate out of the polymer structure.
3. They should be easily reacted into the polymer structure before final processing and the cure of the insulation resin.
4. They should be used at the lowest possible concentrations preferably less than 0.5% w/w, to minimize the effects on electrical properties, including the dielectric constant and dissipation factor, and tensile properties, including tensile strength and flexural modulus.

SUMMARY OF THE INVENTION

The present invention is advantageous and an improved insulated electrical coil formed as a plurality of turns of coil.

Each turn of coil is formed preferably from an impregnated fibrous strip covering each turn of coil. The impregnated fibrous strip forms a cured body of resinous insulation applied to each turn of coil. The cured resinous composition, in one aspect of the present invention, is an epoxy-anhydride resin that has been prereacted with an antioxidant oligomer selected from the group consisting of organophosphorus compounds, sterically-hindered alkylated phenolics, alkyl and aryl thio-esters, alkyl and aryl thio-phosphites, thiazoles, lactones, hydroxylamines, and maleimides. The fibrous strip could comprise glass fibers or micro tape.

In another aspect of the present invention, the organophosphorus compounds comprises one of 2-phenyl-1-1-1,3,2-dioxaphosphepane, Deoxophostone, Vinylphosphonic acid, or Vinylphosphonic acid dimethyl ester. The sterically-hindered alkylated phenolics can be one of 2,6-di-butyl-4-hydroxymethyl phenol, and N-butyl-p-aminophenol. The alkyl and aryl thio-esters could be Trilauryl trithiophosphite. The thiazoles could include 3-(N-salicyloyl)-amino,2,3-thiazole, and the lactone could be one of Benzofuranones or 3-aryl benzo-furan-2-one. The hydroxylamines can be N-(2-hydroxypropyl) ethylenediamine, Hydroxy ethyldiethylenetriamine, or N-(2-hydroxy,2,4,4-trimethylpentyl) diethylene triamine. The maleimides can include 1,1 (Methylene-4, 1-Phenylene) Bis-Maleimide.

In yet another aspect of the present invention, the epoxy-anhydride resin consists essentially of an epoxy-anhydride and styrene. The organo-phosphorus antioxidant oligomer can comprise an oligomer formed with a reaction of one of vinylphosphonic acid or vinylphosphonic acid and its esters with DiglycidylEther of Neo-Pentyl Glycol or DiglycidylEther of 1,4 Butane Diol. The epoxy-anhydride resin, in one aspect, consists essentially of an epoxy resin mixture consisting essentially of a first epoxy resin consisting essentially of a diglycidyl ether of an aliphatic diol and a second epoxy resin selected from the group consisting essentially of bisphenol A epoxy resin, bisphenol F expoxy resins, novolac epoxy resins, glycidyl ester epoxy resins, hydantoin epoxy resins, cycloaliphatic epoxy resins and mixtures thereof, an organic carboxylic acid anhydride, and a chromium (III) acetylacetonate acting as a latent catalyst.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and provides an enhanced processing method and an antioxidant additive for insulation resins used in power generators. The antioxidant additive controls oxidation of polymers and plastics used in thermoset materials typically used as insulation resins. The antioxidant is compatible with the resin and has no deleterious effect on long-term performance or on processing characteristics. It is non-fugitive and does not migrate out of the polymer structure. It is easily reacted into the polymer structure before final processing and cure of the insulation resin. It can be used at the low concentrations, for example, less than 0.5% w/w, and minimizes the effects on electrical and tensile properties, such as to dielectrical strength, dissipation factor, tensile strength and flexural modulus.

Figure 1:
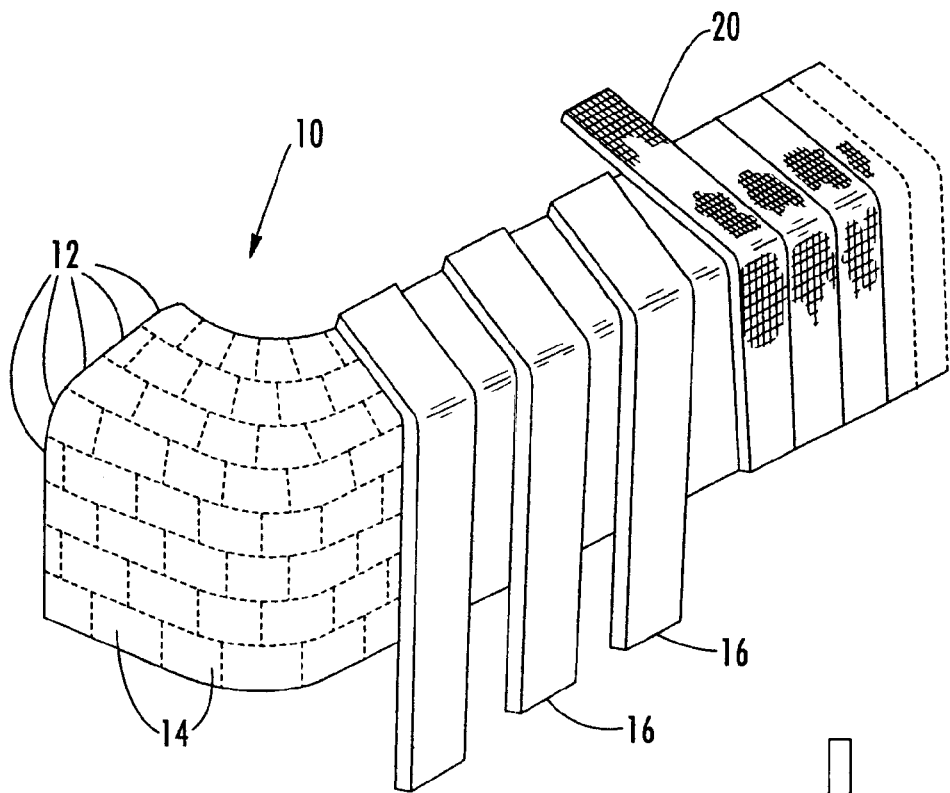
FIG. 1 is a plan view of an example of an electrical coil having two slot portions which can have an insulation resin and antioxidants of the present invention applied thereto.

The present invention is advantageously used with high voltage electrical insulation, such as used with electrical conducting devices, including coils and transformers, such as a wrapped resin-impregnated coil 10 as shown in FIG. 1. The coil is illustrated as having a plurality of turns of conductors 12. Each turn 12 of a conductor could be formed of copper bar 14, wire or similar structure wrapped with turn insulation, such as formed from a fibrous sheet or strip impregnated with a bonding resinous insulation, having the antioxidant of the present invention. Because turn insulation may not withstand severe voltage gradients between a conductor and ground when the coil is installed in a high-voltage generator, ground insulation for the coil can be provided by wrapping one or more layers of composite tape 16 about the turn. This tape 16 could be formed from mica and formed as a pliable backing sheet having a layer of various mica flakes bonded to a resinous binder. It can be half lapped, abutted or applied in some other suitable manner. A number of layers can be wrapped about the coil for high voltage coils and can be decreased depending upon the power of the generator and the effectiveness of the electrical insulator. Asbestos or other glass fiber and similar material could also be applied about the coil as an outer tape 20.

Figure 2:
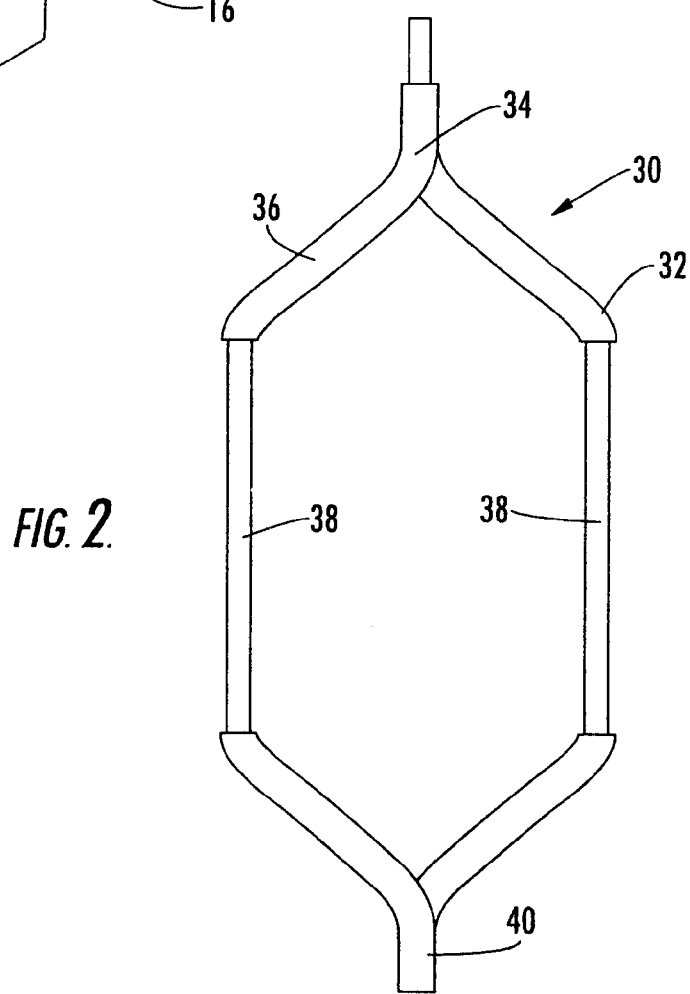
FIG. 2 is a fragmentary perspective view of a high voltage coil with insulated conductors, tape as ground insulation, and porous bonding tape, which can use the insulation resin on antioxidants of the present invention.

FIG. 2 illustrates another example of a closed full coil 30, which could be disposed within slots of a stator surrounding a metal motor armature or generator rotor. It can include an end portion having a tangent 32, a connecting loop 34 and another tangent 36 with bare leads extending therefrom. Slot portions 38 of the coil can be formed such as by hot pressing to pre-cure the resin and form the structure to predetermined shape and size, which is connected to the tangents respectively. These slot portions can be connected to other tangents and connected through another loop 40. In general, generator coils are impregnated and then hot pressed prior to winding. Motor coils are generally post-impregnated "in situ".

The coils are placed with the slots in the stator of an electrical machine and the end linings wrapped and tied together. Any uninsulated leads can be soldered, welded or otherwise connected to each other or to the commutator. In the case of a motor, generally the entire motor that contains any coils can be placed in an impregnating bath containing the impregnating resin and vacuum impregnated. Thereafter, the impregnated motor can be removed from the impregnating tank, drained, placed in an oven and heated to a temperature the completely reactive composition in the coils.

Although the description has proceeded with reference to resin applications to coils, it should be understood that the invention can be used for many different applications as suggested by those skilled in the art.

The antioxidant is suitable for use with epoxy insulation resins such as disclosed in U.S. Pat. Nos. 4,254,351; 4,173,593; 4,137,275; and 4,204,181, the disclosures which are hereby incorporated by reference in their entirety. The compositions described in these patents are amenable to modification with the antioxidant oligomer of the present invention to give improved oxidation resistant polymeric insulation materials.

The epoxy resins are typically an epoxy anhydride resin, and in one aspect of the present invention, are an epoxy-anhydride-styrene resin. In another aspect, the epoxy-anhydride resin can consist essentially of a first epoxy resin consisting essentially of a diglycidyl ether of an aliphatic diol and a second epoxy resin selected from the group consisting essentially of bisphenol A epoxy resin, bisphenol F expoxy resins, novolac epoxy resins, glycidyl ester epoxy resins, hydantoin epoxy resins, cycloaliphatic epoxy resins and mixtures thereof, an organic carboxylic acid anhydride, and a chromium (III) acetylacetonate acting as a latent catalyst.

Examples of the type of resin that the antioxidant oligomer of the present invention can be used includes as non-limiting example, a highly fluid, solventless, resinous, impregnating and coating composition, suitable as high voltage insulation for electrical members, such as made from an admixture containing: 100 parts of an epoxy resign, about 25 to 200 parts of an acid anhydride reactive with the epoxy resin, and about 0.002 to 1.00 part of a selected metal acetylacetonate, acting as a latent accelerator, as disclosed in the incorporated reference '275 and '181 patents.

Another example of such a resin is an epoxy-styrene, solventless resin impregnating varnish, have an atmospheric catalyzed pot life at room temperature of at least 45 days. This type of resin can be made by mixing: (1) the product of the reaction of (a) 1 part of an epoxy resign mixture, comprising solid epoxy resign and liquid epoxy resign wherein the weight ratio of solid epoxy: liquid epoxy is between 1:1 to 1:10; with (b) between about 0.01 part to 0.06 part of maleic anhydride and (c) a catalyst under such conditions that the epoxy diester formed an acid number of between about 0.5 to 3.0; with (2) a coreactive vinyl monomer; and between about 0.0003 part to 0.004 part of a room temperature stabilizer; (3) between about 0.3 part to 1.2 part of a polycarboxyic anhydride, which is soluble in the mixture of (1) and (2), and an amount of free radical catalyst that is effective to provide a catalytic effect on the impregnating varnish and to cure it at temperatures of over about 85° C., and with (4) between 0.0005 part to 0.005 part of a metal acetylacetonate, selected from the group consisting of chromium (III) acetylacetonate, manganese (III) acetylacetonate, ferric (iron III) acetylacetonate, zinc (III) acetylacetonate, aluminum (III) acetylacetonate, sodium (I) acetylacetonate, uranyl (VI) acetylacetonate, and mixture thereof, acting as latent accelerator, such as disclosed in the '351 and '593 patents.

Figure 3:
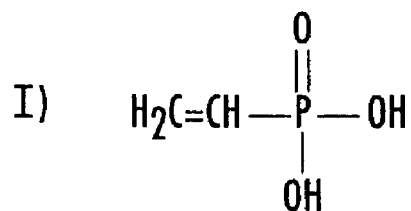
FIGS. 3–5 are examples of vinylphosphonic acid monomers and ester derivatives as antioxidants that can be used with the present invention.
Figure 4:
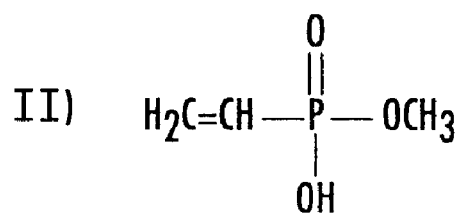
Figure 5:
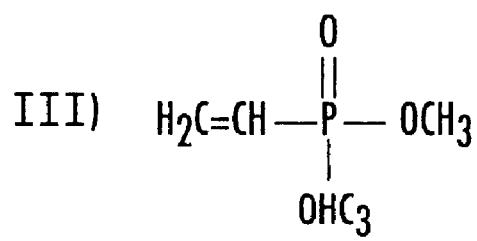

Various examples of different antioxidants that are suitable for various epoxy resins, such as the non-limiting examples described above include various of the following, including, but not limited to:
  a. Organophosphorus compounds, e.g., organophosphates, vinylphosphonic acid and its esters;
  b. Sterically-hindered alkylated phenolics
  c. Alkyl and aryl thio-esters and thio-phosphites
  d. Thiazoles
  e. Lactones
  f. Hydroxylamines
  g. Maleimides Non-limiting examples of various vinylphosphoric acids and its esters are shown in FIGS. 3–5.

Various specific examples of these different classes of compounds listed above include:
  a. Phosphites
    I) 2-phenyl-1-1-1,3,2-dioxaphosphepane
    II) Deoxophostone
    III) Vinylphosphonic acid
    IV) Vinylphosphonic acid dimethyl ester
  b. Phenolics
    I) 2,6-di-butyl-4-hydroxymethyl phenol
    II) N-butyl-p-aminophenol
  c. Thio-esters
    Trilauryl trithiophosphite
  d. Thiazoles
    3-(N-salicyloyl)-amino,2,3-thiazole
  e. Lactones
    Benzofuranones
    3-aryl benzo-furan-2-one
  f. Hydroxylamines
    N-(2-hydroxypropyl) ethylenediamine Hydroxy ethyldiethylenetriamine
    N-(2-hydroxy,2,4,4-trimethylpentyl) diethylene triamine
  g. Maleimides
    1,1 (Methylene-4, 1-Phenylene) Bis-Maleimide These antioxidant additives possess the appropriate chemistry that makes them suitable for pre-reaction with typical components used in synthesizing epoxy insulation resins, as for example, those described in and incorporated by reference '351, '593, '275 and '181 patents.

For example, they could be added, at low concentration, to the prepolymer materials used in making commercially available 53841PU epoxy resin, manufactured by Siemens, Westinghouse and disclosed in the incorporated reference patents. In this manner, the antioxidant could be induced to chemically bond to the prepolymer materials, thereby preventing migration problems and compatibility problems during later processing use.

Vinylphosphonic acid monomer and its ester derivatives (FIGS. 3 through 5), for example, are beneficial because these monomers could be blended with styrene, which is added to the epoxy resign components. During cure, styrene and vinylphosphonic acid could copolymerize together, chemically attaching the exemplary organo-phosphorus compounds to the polymer network. This is a simple and low-cost method of incorporating antioxidant compounds into the resin, instead of using a synthetic procedure of pre-reacting these materials with the epoxy components. Other classes of antioxidants may also be suitable. Any final selection of additive and its concentration could be made depending on an end use impact of the free-radical species responsible for thermo-oxidative processes.

The impact of this type of thermal stability modification to insulation resins may be significant. if carried to its fullest extent, it is conceivable that existing "Class F" resins, e.g., the 53841PU epoxy and similar resins, might be stabilized to make them perform as a "Class H" Level-40 material. This would eliminate the need for developing and testing a totally new type of resin system for higher temperature performance.

It is also possible that each type of modified resin could have its own "customized" concentration and version of a reacted antioxidant. It is also possible to use the modified resins with high performance Liquid Crystal Thermoset (LCT) epoxy resin. Other possible reactive antioxidant oligomers compatible with epoxy VPO resins are possible. In the following examples:

DGENPG=DiglycidylEther of Neo-Pentyl Glycol
DGEBUD=DiglycidylEther of 1,4 Butane Diol.

These possible oligomers include:
1. DGENPG+Maleimide.
2. DGENPG+Vinyl Phosphonic Acid.
3. DGENPG+Vinyl Phosphonic Acid Monoethylester
4. DGENPG+1,1 (Methylene-4, 1-Phenylene) Bis-Maleimide
5. DGENPG+6-Azauracil.
6. DGENPG+Cyanuric Acid.
7. DGENPG+Triphenyl Phosphate.
8. DGENPG+Triphenyl Phosphite.
9. Styrene+Malemide.
10. Styrene+Vinyl Phosphonic Acid.
11. Vinyl-toluene+Maleimide
12. Vinyl-toluene+Vinyl Phosphonic Acid Monoethylester.
13. t-Butylstyrene+Vinyl Phosphonic Acid.
14. t-Butylstyrene+Maleimide.
15. DGEBUD+Vinyl Phosphonic Acid.
16. DGEBUD+Cyanuric Acid.

Examples of the synthesis of antioxidant oligomers used in the present invention, and more particularly, organo-phosphorus antioxidant oligomers are:

EXAMPLE 1

25 g of Diglycidether of Neopentyl Glycol (DGENPG) was placed in a glass container with a lid (to keep out moisture) and stirred by means of a magnetic stir bar. 25 g of Tripenyl Phosphite was added dropwise to the DGENPG over a period of two hours at room temperature. 0.5 g of Benzydimethylamine (BDMA) was then added dropwise to the stirred solution as a reaction accelerator and the temperature of the solution was raised to 60° C. by means of a hot plate and kept at that temperature for a period of three hours. Co-reaction between the DGENPG and the Triphenyl Phosphite to form an oligomer was indicated by a noticeable increase in solution viscosity (from initially 100 cps to >2,000 cps) during this period. The reaction solution was then allowed to cool back to room temperature to slow down the rate of reaction.

The compatibility and co-reactivity of this oligomer product with a styrene-epoxy-anhydride resin was demonstrated as follows:

2.5 g of the oligomer was added to 10 g of a styrene-epoxy-anhydride resin (described in U.S. Pat. Nos. 4,254,351 and 4,173,593) and stirred in a glass container with a magnetic stirring bar for two hours. 10 g of this solution was then placed in a small aluminum dish and cured for four hours at 135° C. and 16 hours at 150° C. After cooling to room temperature, the sample was checked for degree of cure (via surface hardness measurements) and homogeneity by dissecting the sample and examining the inside surfaces under a powerful microscope. The results confirmed that the added oligomer was totally miscible and co-reactive with the styrene-epoxy-anhydride resin.

EXAMPLE 2

25 g of Diglycidether of Neopentyl Glycol (DGENPG) was placed in a glass container with a lid (to keep out moisture) and stirred by means of a magnetic stir bar. 10 g of Vinyl Phosphonic Acid was added dropwise over a period of three hours at room temperature. It was observed that during the addition of the Vinyl Phosphonic Acid a mild exothermic reaction occurred indicated by a noticeable warming of the glass container holding the DGENPG solution. Co-reaction between the DGENPG and the Vinyl Phosphonic Acid to form an oligomer was confirmed by a noticeable increase in solution viscosity (from initially 100 cps to >2,000 cps) during this period. The reaction solution was then allowed to cool back to room temperature to slow down the rate of reaction.

The compatibility and co-reactivity of this oligomer product with a styrene-epoxy-anhydride resin was demonstrated as follows:

2.5 g of the oligomer was added to 100 g of a styrene-epoxy-anhydride resin (described in U.S. Pat. Nos. 4,254, 351 and 4,173,593) and stirred in a glass container with a magnetic stirring bar for two hours. 10 g of this solution was then placed in a small aluminum dish and cured for four hours at 135° C. and 16 hours at 150° C. After cooling to room temperature, the sample was checked for degree of cure (via surface hardness measurements) and homogeneity by dissecting the sample and examining the inside surfaces under a powerful microscope. The results confirmed that the added oligomer was totally miscible and co-reactive with the styrene-epoxy-anhydride resin.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A high voltage electrical insulation comprising:
   at least one fibrous strip impregnated with a cured epoxy-anhydride resin, wherein said resin has been prereacted with an organo-phosphorus antioxidant oligomer before curing and subsequently cured to form a cured body of resinous insulation that is resistant in its cured state to corrosive by-products, including ozone and peroxy free radicals, created by partial discharges within an electrical generator.

2. A high voltage electrical insulation according to claim 1, wherein said epoxy-anhydride resin comprises epoxy-anhydride and styrene.

3. A high voltage electrical insulation according to claim 1, wherein said organo-phosphorus antioxidant oligomer comprises an oligomer formed with a reaction of one of vinylphosphonic acid or vinylphosphonic acid and its esters with DiglycidylEther of Neo-Pentyl Glycol or DiglycidylEther of 1,4 Butane Diol.

4. A high voltage electrical insulation according to claim 1, wherein said fibrous strip comprises glass fibers or mica tape.

5. A high voltage electrical insulation according to claim 1, wherein said organo-phosphorus antioxidant oligomer comprises an oligomer formed with a reaction of one of vinylphosphonic acid or vinylphosphonic acid and its esters with DiglycidylEther of Neo-Pentyl Glycol or DiglycidylEther of 1,4 Butane Diol.

6. A high voltage electrical insulation comprising at least one fibrous strip impregnated with an insulating and cured resinous composition Comprising an epoxy-anhydride resin, wherein said resin has been prereacted with an antioxidant oligomer before curing and selected from the group consisting of organophosphorus compounds, sterically-hindered alkylated phenolics, alkyl and aryl thio-esters, alkyl and aryl thio-phosphites, thiazoles, lactones, hydroxylamines, and maleimides and subsequently cured to form a cured body of resinous insulation that is resistant in its cured state to corrosive by-products, including ozone and peroxy free radicals, created by partial discharges within an electrical generator.

7. A high voltage electrical insulation according to claim 6, wherein said organophosphorus compounds comprises one of:

2-phenyl-1-1-1,3,2-dioxaphosphepane, Deoxophostone, Vinyiphosphonic acid, or Vinylphosphonic acid dimethyl ester.

8. A high voltage electrical insulation according to claim 6, wherein said sterically-hindered alkylated phenolics comprises one of:

2, 6-di-butyl-4-hydroxymethyl phenol, and N-butyl-p-aminophenol.

9. A high voltage electrical insulation according to claim 6, wherein said alkyl and aryl thio-esters comprises:

Trilauryl trithiophosphite.

10. A high voltage electrical insulation according to claim 6, wherein said thiazoles comprises:

3-(N-salicyloyl)-amino,2,3-triazole.

11. A high voltage electrical insulation according to claim 6, wherein said lactone comprises one of:

Benzofuranones or 3-aryl benzo-furan-2-one.

12. A high voltage electrical insulation according to claim 6, wherein said hydroxylamines comprises One of:

N-(2-hydroxypropyl) ethylenediamine, Hydroxy ethyldiethylenetriamine or N-(2-hydroxy,2,4,4-trimethylpentyl) diethylene triamine.

13. A high voltage electrical insulation according to claim 6, wherein said maleimides comprises:

1,1 (Methylene-4, 1-Phenylene) Bis-Maleimide.

14. A high voltage electrical insulation according to claim 6, wherein epoxy-anhydride resin consists essentially of an epoxy-anhydride and styrene.

15. A high voltage electrical insulation according to claim 6, wherein said epoxy-anhydride resin consists essentially of an epoxy resin mixture consisting essentially of a first epoxy resin consisting essentially of a diglycidyl ether of an aliphatic diol and a second epoxy resin selected from the group consisting essentially of bisphenol A epoxy resin, bisphenol F expoxy resins, novolac epoxy resins, glycidyl ester epoxy resins, hydantoin epoxy resins, cycloaliphatic epoxy resins and mixtures thereof;

an organic carboxylic acid anhydride; and a chromium (III) acetylacetonate acting as a latent catalyst.

16. An insulated electrical coil comprising a plurality of turns of coil and each having a cured body of resinous insulation applied to each turn of coil, the insulation comprising a cured resinous composition comprising epoxy-anhydride resin, wherein said resin has been prereacted with an antioxidant oligomer before curing and selected from the group consisting of organophosphorus compounds, sterically-hindered alkylated phenolics, alkyl, and aryl thio-esters, alkyl and aryl thio-phosphites, thiazoles, lactones, hydroxylamines, and maleimides and subsequently cured to form a cured body of resinous insulation that is resistant in its cured state to corrosive by-products, including ozone and peroxy free radicals, created by partial discharges within an electrical generator.

17. An insulated electrical coil according to claim 16, wherein said cured body of resinous insulation comprises an impregnated fibrous strip covering each turn of coil.

18. An insulated electrical coil according to claim 16, wherein said fibrous strip comprises glass fibers or mica tape.

* * * * *